Figure 1:
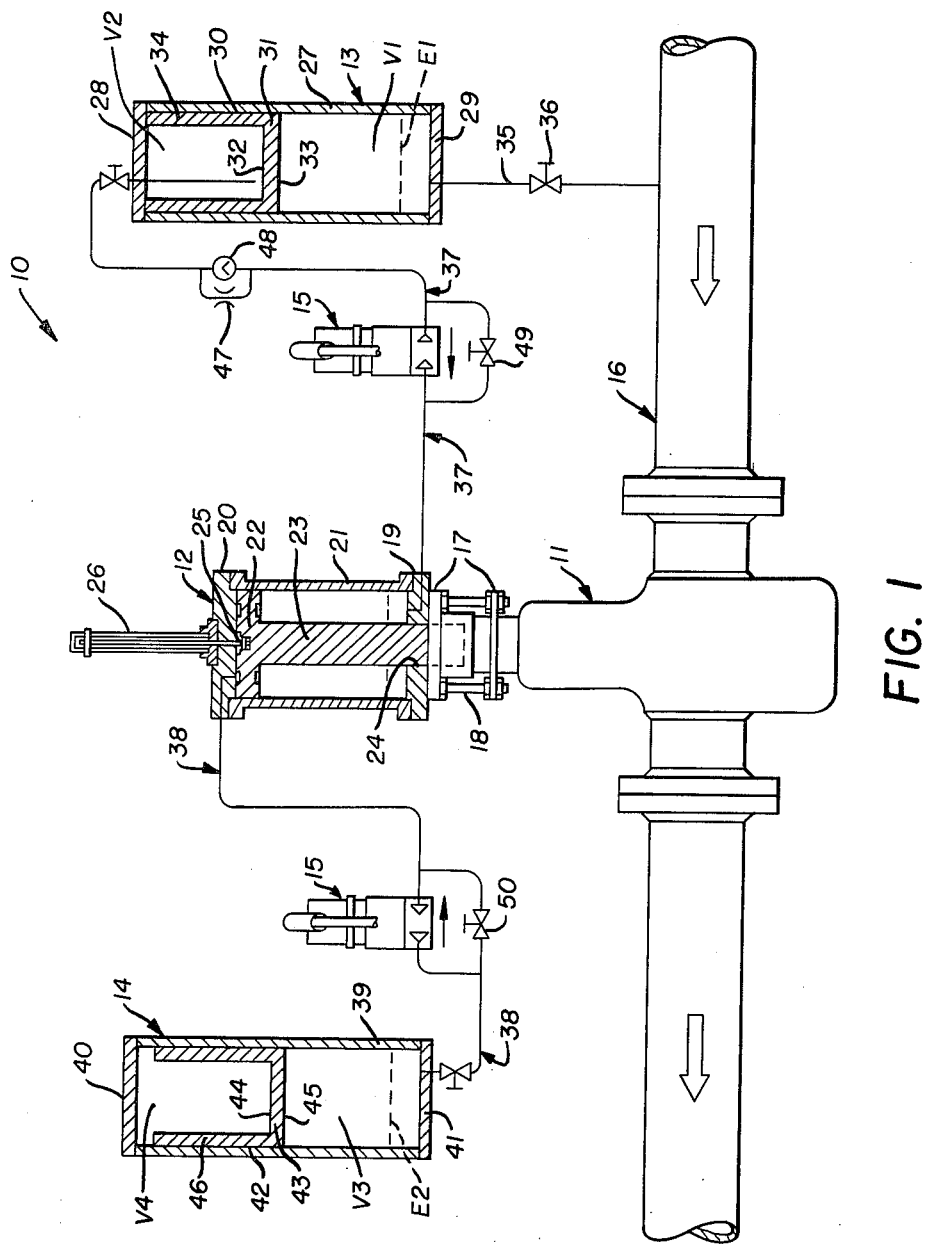

Dec. 14, 1965  H. J. SHAFER  3,223,114
AUTOMATIC SHUT-OFF FOR PIPELINE
Filed March 19, 1963  2 Sheets-Sheet 1

INVENTOR.
HOMER J. SHAFER
BY Hamilton & Cook
ATTORNEYS

Dec. 14, 1965     H. J. SHAFER     3,223,114
AUTOMATIC SHUT-OFF FOR PIPELINE
Filed March 19, 1963     2 Sheets-Sheet 2
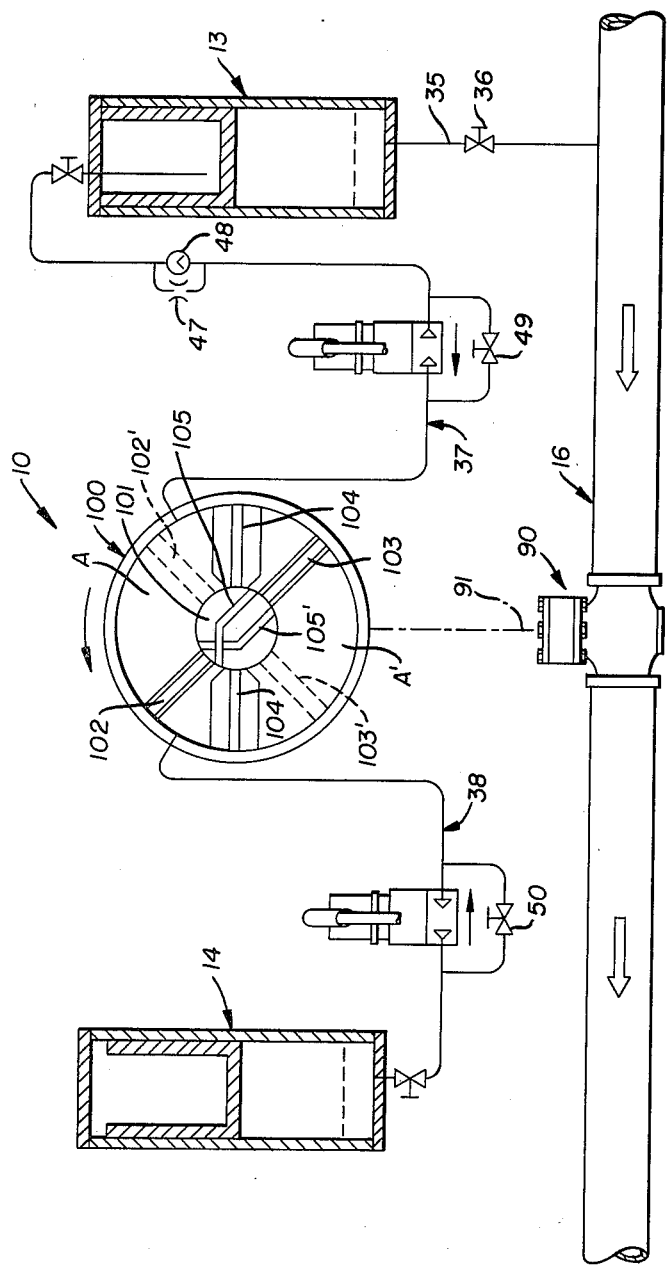
FIG. 2
INVENTOR.
HOMER J. SHAFER
BY 
ATTORNEYS United States Patent Office 3,223,114
Patented Dec. 14, 1965

3,223,114
AUTOMATIC SHUT-OFF FOR PIPELINE
Homer J. Shafer, P.O. Box 83, Mansfield, Ohio
Filed Mar. 19, 1963, Ser. No. 266,330
2 Claims. (Cl. 137—494)

The present invention relates to an improved valving system for a pipeline. More particularly, the invention relates to an improved system for automatically arresting the flow of liquid in a pipeline and reinitiating the flow according to predetermined conditions. Specifically, the invention relates to apparatus in a system for automatic shut-off of liquid, which prevents damaging water-hammer.

In large pipeline networks, such as in waterworks, utilities, refineries, or bulk transfer systems, a multiplicity of valves may be installed at remote locations for controlling dispatch of liquids in the pipelines. These valves are also employed to prevent undesired drainage, siphoning or cavitation, and to prevent comingling of liquids being transported through the pipelines. Inasmuch as these valves must be operated at precisely the proper time in order to prevent the above-mentioned problems, manually-operated valving has proven unsatisfactory due to the inherent lack of precise dispatch control and the requirement for an unduly large crew of personnel for operating a complex or widespread system. Hence, in recent years, increasing use has been made of automatic valving.

However, all of the proposed automatic systems, of which applicant is aware, have embodied elaborate or complex flow velocimeter arrangements, regulator devices, electrically operated motors actuated by telemetry systems, and the like. Such systems are not only expensive to install; but, also, the complexity of the prior art apparatus presents expensive and troublesome maintenance problems in operation.

Furthermore, none of such prior art apparatus has presented any solution to one of the chief problems encountered in valving or arresting pipeline flow, namely, the phenomenon having deleterious effects on pipeline components and commonly known as "water-hammer."

Water-hammer is the effect produced by the buildup of localized stresses in pipeline parts created by the sudden arresting of the flow of a column of water or other liquid. The kinetic energy of the moving liquid is transformed into energy in the form of traveling pressure waves in the liquid which are propagated from the terminal valve point back towards the liquid source. These waves travel at nearly the speed of sound and are rapidly reflected with reinforced intensity back to the valve, creating substantial localized pressure buildup at the valve, flanges, and pipes. The magnitude of this pressure is directly proportional to the magnitude of the velocity of the extinguished flow, the bulk modulus of elasticity of the liquid, and the specific gravity of the liquid. Since the latter two factors are known and constant for a given liquid, the crucial variable is the velocity of the extinguished flow; and it can be readily understood that the water-hammer pressure developed is increased under increased demand and flow conditions.

In practical applications, this water-hammer problem cannot be alleviated through use of common devices such as relief valves and the like due to the very short duration of the high amplitude pressure and stress buildups. Hence, the strength and size of the pipe, valve, and flange elements of the pipeline systems have required overdesigning by safety factors as great as 25–50% in some installations. Clearly, these additional design considerations and safety factors have increased the initial costs of installation considerably in large pipeline systems. Moreover, maintenance failure problems, caused by water-hammer damage to corroded or weakened components, still persist.

It is, therefore, an object of the present invention to provide an automatic shut-off system for arresting the flow of liquid in a pipeline, employing simple, inexpensive apparatus.

It is a further object of the invention to provide automatic shut-off apparatus in a system for arresting the flow of liquid in a pipeline without damaging water-hammer effects.

It is a still further object of the invention to provide an automatic shut-off system for a liquid transporting pipeline which will automatically reopen upon restoration of pressure in the pipeline to a predetermined magnitude.

It is an even further object of the present invention to provide an automatic shut-off system for a liquid pipeline which provides selective automatic and manual operation of the valving.

These and other objects of the present invention will become apparent upon reference to the drawings and description in the following specification.

In the drawings:

FIG. 1 is an elevational sectional view, partially schematic, of automatic shut-off apparatus applied in a system for operation of a piston-actuated gate valve in a liquid pipeline; and FIG. 2 is a similar view illustrating the application of the apparatus for actuation of a hydraulic motor-operated rotary plug valve in a liquid pipeline.

The automatic shut-off system, according to the present invention, is indicated generally in the drawings by the numeral 10. The system comprises a liquid pipeline valve 11 onto which a hydraulically driven fluid motor operator 12 is operatively mounted. A first, or pressure-sensing, cylinder or reservoir 13 is connected to sense line pressure on the upstream side of the valve 11 and is hydraulically connected to the valve operator 12 to maintain the valve 11 in an open position so long as the line pressure remains above a predetermined magnitude. A second, or valve operator biasing cylinder or reservoir 14 is hydraulically connected to the valve operator 12 and adapted to oppose the hydraulic opening force exerted thereon by the first cylinder 13, and to urge the valve 11 into a closed position when the line pressure falls below a predetermined magnitude.

The system 10 also may include one or more hand pumps 15, as well as appropriate control valving, to permit manual operation of the system for maintenance and service purposes.

Referring to FIG. 1, the system 10 is shown as applied to a gate valve 11 in a liquid pipeline 16. A piston valve operator 12 is operatively mounted on the gate valve body 11 by flanges 17 and bolts 18. The piston valve operator 12 comprises a bottom end plate 19 and a top end plate 20 with a cylindrical casing 21 joining the plates 19 and 20 to form a hydraulic cylinder. A piston 22 is disposed within the casing 21 for reciprocation and has a piston stem or neck portion 23 which extends through a fluid-tight bore 24 in bottom end plate 19 for mechanical connection with the gate member (not shown) of gate valve 11. Additionally, the piston valve operator, if desired, may include a position indicator rod 25 secured to the piston head 22. The rod 25 extends through a fluid-tight bore in top end plate 20 into a conventional open bracket or sight housing 26 which is graduated to indicate relative open and closed positions of the gate valve 11. Thus, the position of indicator rod 25 shown in FIG. 1 corresponds to the fully extended, uppermost position of piston 22 or the fully open position of gate valve 11.

The first, or pressure sensing, cylinder 13 includes a casing 27 enclosed by an upper end plate 28 and a lower end plate 29 and a floating bucket piston 30 disposed therein for reciprocal movement. The bucket piston 30 has a head 31 with upper face 32 and lower face 33 and has an upwardly extending cylindrical portion 34. The relative position of the bucket piston 30 within the cylinder 13 defines two volumes V1 and V2, the significance of which will be understood with reference to the description of operation, below.

A conduit or tubing connection 35 is made between the side of the liquid pipeline 16 which is upstream from the valve 11 and the lower volume V1 within the cylinder 13. Thus, liquid from the pipeline under pipeline operating pressure is introduced into the cylinder 13 through the normally open petcock 36 to occupy the volume V1.

The upper volume V2 of cylinder 13 is connected by first conduit or tubing means 37 to the interior of casing 21 through bottom end plate 19 of the piston valve operator 12. Under operating conditions, the volume V2, tubing means 37, and the interior volume of casing 21 will be charged with hydraulic or incompressible pressure fluid at a predetermined pressure which is less than the liquid pressure in pipeline 16, the pressure differential furnishing the motive force for automatic valve operation in a manner discussed below.

The volume within casing 21 above piston 22 is connected through port means in top end plate 20 to second conduit or tubing means 38 leading to valve operator biasing cylinder 14 and furnishing an operative hydraulic connection between valve operator 12 and biasing cylinder 14. This second, or biasing cylinder 14 is similar in construction to the first, or pressure sensing, cylinder 13 in that it includes a casing 39 enclosed by an upper end plate 40 and a lower end plate 41. A floating bucket piston 42 is disposed therein for reciprocal movement and has a head 43 with upper face 44 and lower face 45 as well as a cylindrical portion 46.

The relative position of the bucket piston 42 defines a lower volume V3 and an upper volume V4. The lower volume V3 is hydraulically connected to the tubing means 38 through porting means in lower end plate 41; and, under operating conditions, volume V3 and tubing means 38 are charged with hydraulic or incompressible pressure fluid at the same pressure as the fluid in volume V2 and tubing means 37. The volume V4 is charged with a captive volume of compressible gas or pressure fluid which, with the valve 11 fully open, will be under a pressure equal to that in volume V3.

The operation of the automatic shut-off system 10 may be best understood with reference to a typical set of operating conditions, by way of example. For instance, the pipeline 16 may carry liquid under a pressure of 1000 p.s.i. With the valve 11 fully open to flow, the volumes V2 and V3 and conduits 37 and 38, as well as the volume within casing 21, may be charged with hydraulic oil under, say, 600 p.s.i. pressure. In such case, volume V4 in the biasing cylinder 14 will be charged with a biasing head of an inert gas, such as carbon dioxide, which is likewise at a pressure of 600 p.s.i.

Since the volume V1 in the sensing cylinder 13 will be filled with liquid from the pipeline 16 at operating pressure (viz 1000 p.s.i.), the system 10 will be maintained with the piston 22 fully up (and thus the valve 11 fully open) by a pressure differential of 400 p.s.i. When the line pressure drops to below 600 p.s.i., as for example by shutdown of the pipeline pump, there is no longer a pressure differential between the hydraulic fluid and the pipeline liquid; and the hydraulic fluid from conduits 37 and 38, respectively, begins to urge bucket piston 30 and piston 22 downwardly. At the same time the carbon dioxide under pressure is urging bucket piston 42 downwardly. But, assuming the system is at constant temperature (i.e., isothermal) and since the gas is in its range of free expansion and compression, downward movement of bucket piston 42 increases volume V4, causing expansion of the carbon dioxide and a change in gas pressure inversely proportional with the change in volume, all in accordance with Boyle's law. Thus, as the bucket piston 42 moves downward the carbon dioxide pressure continually decreases, and the hydraulic fluid, which is incompressible, must exert a counteracting or balancing upward pressure on the gas. The net result is that the system interaction of decreasing gas and pipeline pressure effects a corresponding decrease in hydraulic pressure, thereby effecting a relatively gradual change in the pressure differential acting to close valve 11. Valve 11 will be fully closed preferably when the pipeline pressure decreases to about 300 pounds, at which time bucket pistons 30 and 42 will have descended to equilibrium positions E1 and E2, respectively.

Thus, the automatic closing of valve 11 is accomplished, due to the system cushioning, without damaging water-hammer effects on the pipe and valves. When the pressure in the pipeline is again restored to the requisite level (i.e., 600 p.s.i. and above), the operation is reversed, and the valve opened.

From the foregoing description of operation, furnished by way of example, it will be apparent that the several concepts according to the present invention may be employed under any of a variety of operating pressures and using any suitable pressure fluids. Moreover, a solidified or liquified gas might be employed in volume V4 if modified characteristics of pressure differential build-up and valve closure are desired. All these and similar variations may be employed without departing from the true spirit and scope of the invention.

In FIG. 2 the automatic shut-off apparatus 10 is shown as applied to a hydraulic motor 100 operating a rotary plug valve 90 in pipeline 16 by mechanical connection indicated schematically by chain lines 91. The motor shown is a rotary operator type having a rotor 101, moving vanes 102 and 103, stationary shoes 104, and crossover paths 105 and 105' through the rotor for balanced torque operation. In the position shown, the rotor 101 has the vanes 102 and 103 extending radially therefrom in a position corresponding to the fully-open position of plug valve 90 and full operating pressure in the upstream side of the liquid pipeline 16.

Inasmuch as the other elements of the system 10 are substantially identical with those of the species of the invention shown in FIG. 1, when the operating pressure in liquid pipeline 16 falls below a predetermined value, the elements of the system coact, in a manner already fully discussed above, to establish an ingress of hydraulic fluid into motor 100 through conduit means 38 and an egress of fluid from the motor through conduit means 37. Here, again, the expanding gas in volume V4 and the hydraulic fluid in the system set up a balancing or cushioning effect to establish a slight pressure differential and produce a pressure in conduit means 37 to rotate vanes 102 and 103 to the phantom line positions indicated at 102' and 103'. These positions correspond to the fully-closed position of the rotary plug valve 90; and, as in the case of the piston gate valve 11 of FIG. 1, the system effects an automatic closing of the valve which is controlled and gradual, thereby preventing damaging water-hammer.

Referring now to FIGS. 1 and 2, the systems 10 include additional desirable features affording selective adjustment and manual operation for maintainance and service purposes. Conduit means 37 include a parallel valve arrangement comprising an adjustable flow control or orifice valve 47 and a check valve 48. The check valve 48 permits unrestrained pressure fluid flow from volume V2 in cylinder 13 to perator 12 or operator 100, whichever is utilized, to effect valve opening. However, reverse flow, from the operator to volume V2, is blocked by the check valve 48; and this flow, which occurs during valve closure, is shunted through the adjustable orifice valve 47, thereby furnishing additional means to control the rate of valve closure and prevent damaging water-hammer.

For manual operation, the system is provided with hand pumps 15 paralleling petcocks 49 and 50 in conduit means 37 and 38, respectively. These petcocks are normally open for automatic operation providing a bypass path around the hand pumps 15. If it is desired to manually open the valve, petcock 36 and 49 are closed (petcock 50 being open); and the hand pump paralleling conduit means 37 is actuated to pump hydraulic fluid from volume V2 to the valve operator. Conversely, to manually open the valve, petcocks 36 and 50 are closed (petcock 49 being open); and the hand pump paralleling conduit means 38 is actuated to pump fluid from volume V3 to the valve operator. Thus, means for manually actuating the valve, as desired, are provided.

From the foregoing specification, it will be apparent that the several objects of the invention may be accomplished by the apparatus described above and hereinafter claimed, the scope of the invention being measured solely by the appended claims.

I claim:

1. An automatic shut-off system for a liquid transporting pipeline comprising, a valve mounted on said pipeline, a hydraulic piston motor operatively connected to said valve for selectively controlling the flow of liquid in said pipeline, a pressure sensing cylinder having a piston therein, a conduit connecting said pressure sensing cylinder and said pipeline at a point upstream of said valve, a second conduit connecting said pressure sensing cylinder and said hydraulic piston motor, a hydraulic reservoir cylinder having a piston therein, a conduit connecting said hydraulic reservior cylinder and said hydraulic piston motor, and a sealed compartment formed by said piston in said hydraulic reservoir cylinder containing a cushioning head of gas to maintain a pressure differential within the system, whereby said valve is slowly moved to prevent water hammer when the liquid flow is arrested.

2. An automatic shut-off system for a liquid transporting pipeline comprising, a valve mounted on said pipeline, a rotary hydraulic motor operatively connected to said valve for selectively controlling the flow of liquid in said pipeline, a pressure sensing cylinder having a piston therein, a conduit connecting said pressure sensing cylinder and said pipeline at a point upstream of said valve, a second conduit connecting said pressure sensing cylinder and said rotary hydraulic motor, a hydraulic reservoir cylinder having a piston therein, a conduit connecting said hydraulic reservoir cylinder and said rotary hydraulic motor, and a sealed compartment formed by said piston in said hydraulic reservoir cylinder containing a cushioning head of gas to maintain a pressure differential within the system, whereby said valve is slowly moved to prevent water hammer when the liquid flow is arrested.

References Cited by the Examiner
UNITED STATES PATENTS

| | | | |
|---|---|---|---|
| 1,884,810 | 19/1932 | Muller | 137—510 |
| 2,239,893 | 4/1941 | Jackman | 91—4 XR |
| 2,320,886 | 6/1943 | Quiroz | 137—505.42 XR |
| 2,738,945 | 3/1956 | Shafer | 251—57 XR |
| 2,836,192 | 5/1950 | Shafer | 251—57 XR |
| 2,891,570 | 6/1959 | Krupp | 137—509 |
| 3,102,553 | 9/1963 | Ottestad | 137—509 |

M. CARY NELSON, *Primary Examiner.*

MARTIN P. SCHWADRON, *Examiner.*